2,785,965

N-ARYL-N'-(p-HYDROXYPHENYL)UREAS AS ANTIOXIDANTS FOR PETROLEUM HYDROCARBON FUELS

Eugene F. Hill, Birmingham, and David O. Depree, Royal Oak, Mich., assignors to Ethyl Corporation, New York, N. Y., a corporation of Delaware No Drawing. Application April 16, 1954, Serial No. 423,835

4 Claims. (Cl. 44—71)

This application is a continuation-in-part of our copending application, Serial Number 268,455, filed January 26, 1952, now Patent No. 2,683,82.

This invention relates to urea derivatives. More particularly this invention relates to hydrocarbon-substituted N-phenyl-N'-hydroxyphenyl ureas.

The substance N-p-hydroxyphenyl urea, has been described heretofore. This material possesses no utility in the field of oxidation inhibition. We have discovered, however, that by substituting the free amine of N-p-hydroxyphenyl urea with a phenyl group, and further substitute either this phenyl or the hydroxy phenylated nitrogen with a hydrocarbon radical we obtain a class of substances which are powerful gasoline antioxidants. So far as we are aware it has not previously been known that the mere addition of such hydrocarbon groups to an otherwise inactive compound would produce thereby materials which would prevent deterioration of petroleum hydrocarbons by the action of oxygen.

Therefore it is an object of this invention to provide a new class of antioxidant materials useful in protecting petroleum hydrocarbons from deterioration in the presence of oxygen or air. In particular it is an object of this invention to provide liquid petroleum hydrocarbon fuels of the gasoline type stable to oxidation.

In accordance with our invention we provide fuel compositions containing ureas of the structure

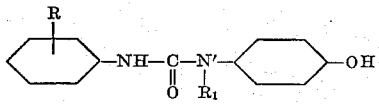

Typical hydrocarbon groups which we employ include methyl, ethyl, propyl, n-butyl, sec.-butyl, isobutyl, octyl, dodecyl, pentadecyl, cyclobutyl, cyclohexyl, benzyl, phenethyl, phenyl, o-tolyl, m-tolyl, p-tolyl, the xylyls, o-phenylene, allyl, propenyl, butenyl, crotyl, methallyl, phytyl, isobutenyl, oleyl, cyclohexenyl, and the like.

The free amine from which these antioxidants can be considered as being derived, in addition to being inactive as an antioxidant, possesses a low degree of solubility in petroleum hydrocarbons. However, in accordance with this invention, we not only increase the solubility in petroleum hydrocarbons but obtain the unexpected result that thereby is created an antioxidant material which is as potent as many commercial antioxidants and more potent than several.

In general the compounds of these compositions are prepared readily and in good yield by combining arylisocyanates with p-aminophenols. In the examples which follow are illustrated the preparation of specific examples of the antioxidants of this invention and in these examples all parts and percentages are by weight.

EXAMPLE I

*N-(p-tolyl)-N'-(p-hydroxyphenyl)urea.*—To a vessel provided with an agitator, means for returning reflux to the reaction vessel, means for introducing liquid reactants, and means for supplying heat was added 100 parts of p-aminophenol and 300 parts of toluene. This mixture was heated to a temperature of 50° C. and 120 parts of p-tolylisocyanate was added over a period of one and one-quarter hours. At the end of the addition the mixture was heated for an additional period of 30 minutes. The reaction mixture containing the product as a suspended solid was filtered and the N-(p-tolyl)-N'-(p-hydroxyphenyl)-urea was recovered in 97 per cent yield based upon the p-aminophenol employed. This product melted at a temperature of 214 to 216° C.

When we treat o-tolylisocyanate and 3-(mixed)amylphenylisocyanate with p-aminophenol according to the process described in Example I, we obtain N-o-tolyl-N'-(p-hydroxyphenyl)urea, and N-(m-(mixed)amylphenyl)-N'-(p-hydroxyphenyl)urea, respectively.

EXAMPLE II

*N-phenyl-N'-methyl-N'-(p-hydroxyphenyl)urea.* — In accordance with the procedure of Example I, N-methyl-p-aminophenol in benzene was treated with phenylisocyanate. The product was recovered as a white crystalline solid.

Similarly, when N-propenyl-p-aminophenol, N-phenyl-p-aminophenol and N-cyclohexyl-p-aminophenol are treated with phenylisocyanate in accordance with the preceding example, N-phenyl-N'-propenyl-, N,N'-diphenyl-, and N-phenyl-N'-cyclohexyl-N'-(p-hydroxyphenyl)urea are obtained respectively.

EXAMPLE III

*N-phenyl-N'-n-butyl-N'-(p-hydroxyphenyl)urea.*—In a process similar to Example I, 100 parts of phenylisocyanate was treated with 137 parts of N-butyl-p-aminophenol to produce N-phenyl-N'-n-butyl-N'-(p-hydroxyphenyl)-urea having a melting point of 158° C.

To illustrate specific examples of that embodiment of this invention wherein two hydrocarbon groups are substituted in the general formula of the antioxidant, when we treat, as described in Example I, o-tolylisocyanate with N-methyl-p-aminophenol, and p-diphenylisocyanate with N-methyl-p-aminophenol we obtain N-(o-tolyl)-N'-methyl-N'-(p-hydroxyphenyl)urea, and N-(p-diphenyl)-N'-methyl-N'-4-hydroxyphenyl urea.

The compounds of this invention are excellent antioxidants and we have illustrated this property in Table I, wherein are listed the results obtained by determining the oxidation stability of gasoline according to the Induction Period Method, ASTM designation: D525–46, as fully described in Part III-A, ASTM Standards for 1946. We have employed gasoline in this determination since it is representative of an important class of industrial products which are susceptible to deterioration, and for which it is important to provide stabilizing materials. The column headed IPI lists the Induction Period Increase, in minutes, over that of the gasoline in the absence of the antioxidants of this invention. That is, under the conditions of test, each gasoline exhibits a period, typical of the gasoline, wherein oxygen is not absorbed. In the presence of the inhibitors this period is increased by the amount listed under IPI. The lack of effectiveness of N-(p-hydroxyphenyl)urea is shown by compound No. 4 in the table.

Table I
EFFECT ON INDUCTION PERIOD INCREASE OF GASOLINE

| No. | Additive | IPI, Min. |
|---|---|---|
| 1 | N-Phenyl-N'-methyl-N'-(p-hydroxyphenyl)urea | 225 |
| 2 | N-(p-tolyl)-N'-(p-hydroxyphenyl)urea | 170 |
| 3 | N-Phenyl-N'-n-butyl-N'-(p-hydroxyphenyl)urea | 110 |
| 4 | N-(p-hydroxyphenyl)urea | 25 |

To illustrate the improved solubility characteristics of the N-aryl-N'-hydroxyphenyl ureas of this invention, we have listed in Table II the solubility, expressed as milligrams of compound per 100 millimeters of solvent, of representative members of these compounds in isooctane, representative of a petroleum product, and have contrasted therein the solubility of the N-phenyl-N'-p-hydroxyphenyl urea unsubstituted with hydrocarbon groups. It is evident that we can obtain more than a four-and-one-half-fold increase in the solubility of the N-aryl-N'-hydroxyphenyl urea by merely substituting one methyl group thereon.

*Table II*

HYDROCARBON SOLUBILITY OF N-ARYL-N'-(HYDROXY-PHENYL)UREAS

| No. | Material | Solubility, mg./100 ml. |
|---|---|---|
| 1 | N-Phenyl-N'-methyl-N'-(p-hydroxyphenyl)urea | 21.2 |
| 2 | N-Phenyl-N'-(p-hydroxyphenyl)urea | 4.6 |

In general, the stabilized fuel compositions of this invention contain an antioxidizing amount of the antioxidant, that is an amount of antioxidant ingredient sufficient to inhibit deterioration. In general, we prefer to employ about 0.01 weight percent of the antioxidant, although depending upon the nature of the gasoline being inhibited this quantity may be varied from this limit.

We have disclosed a number of embodiments of this invention and illustrated several methods whereby these materials can be prepared. However, this invention is not intended to be limited to the specific examples herein.

We claim:

1. A fuel composition stable to oxidation consisting essentially of a liquid petroleum hydrocarbon fuel of the gasoline type normally susceptible to deterioration in the presence of oxygen and in quantity sufficient to inhibit such deterioration, an N-phenyl-N'-(p-hydroxyphenyl)-urea antioxidant ingredient selected from the group consisting of N-phenyl-(N'-methyl-N'-p-hydroxyphenyl)urea, N-(p-tolyl)-N'-(p-hydroxyphenyl)urea, and N-phenyl-N'-n-butyl-N'-(p-hydroxyphenyl)urea.

2. The composition of claim 1 wherein said N-phenyl-N'-(p-hydroxyphenyl)urea is N-phenyl-(N'-methyl-N'-p-hydroxyphenyl)urea.

3. The composition of claim 1 wherein said N-phenyl-N'-(p-hydroxyphenyl)urea is N-phenyl-N'-n-butyl-N'-(p-hydroxyphenyl)urea.

4. The composition of claim 1 wherein said N-phenyl-N'-(p-hydroxyphenyl)urea is N-(p-tolyl)-N'-(p-hydroxyphenyl)urea.

References Cited in the file of this patent

UNITED STATES PATENTS 2,683,081   Hill et al. _____ July 6, 1954